(12) United States Patent
O'Neill (10) Patent No.: US 7,068,473 B2
(45) Date of Patent: Jun. 27, 2006

(54) PIEZOELECTRIC MICROACTUATOR FOR IMPROVED TRACKING CONTROL OF DISK DRIVE READ/WRITE HEADS

(75) Inventor: Conal O'Neill, Hayward, CA (US)

(73) Assignee: Kinetic Ceramics, Inc., Hayward, CA (US)

( * ) Notice: Subject to any disclaimer, the term of this patent is extended or adjusted under 35 U.S.C. 154(b) by 0 days.

(21) Appl. No.: 09/766,749

(22) Filed: Jan. 22, 2001

(65) Prior Publication Data

US 2002/0097663 A1  Jul. 25, 2002

(51) Int. Cl.
*G11B 21/24* (2006.01)
(52) U.S. Cl. .................................. 360/294.4
(58) Field of Classification Search ................ 369/222; 360/291.9, 292, 294.4, 294.5, 110, 77, 78.05
See application file for complete search history.

(56) References Cited

U.S. PATENT DOCUMENTS

| | | | |
|---|---|---|---|
| 4,583,135 A | 4/1986 | Kimura | 360/77 |
| 5,898,541 A | 4/1999 | Boutaghou et al. | 360/294.4 |
| 6,025,975 A | 2/2000 | Fard et al. | 360/294.4 |
| 6,046,888 A | 4/2000 | Krinke et al. | 360/294.4 |
| 6,052,251 A | 4/2000 | Mohajerani et al. | 360/78.05 |
| 6,246,552 B1 * | 6/2001 | Soeno et al. | 360/294.4 |
| 6,359,758 B1 * | 3/2002 | Boutaghou | 360/294.4 |
| 6,362,933 B1 * | 3/2002 | Sampietro et al. | 360/110 |
| 6,414,823 B1 * | 7/2002 | Crane et al. | 360/294.5 |

* cited by examiner

*Primary Examiner*—Tianjie Chen
(74) *Attorney, Agent, or Firm*—John R. Ross; John R. Ross, III (57) ABSTRACT

A disc drive actuation system for precisely positioning a read/write head over a selected track of a rotatable disc. The actuation system comprises a flexure, a slider, and a read/write head firmly attached to the slider. A first drive unit is used to pivot the flexure to position the read/write head approximately over a selected track. A microactuator is mounted to the flexure and the slider is mounted to the microactuator. The microactuator comprises an inner inactive region, a first outer inactive region, a second outer inactive region, a first piezoelectric section mounted between the first outer inactive region and the inner inactive region, and a second piezoelectric section mounted between the second outer inactive region and the inner inactive region. The inner inactive region is firmly attached to either the flexure or the slider and both of the outer inactive regions are firmly attached to the other of the flexure or the slider. Also, there is an electrical circuit for energizing the first and the second piezoelectric sections to cause them to expand and contract in order to precisely position the read/write head over the selected track. The circuit and the piezoelectric sections are configured such that the first piezoelectric section expands when the second piezoelectric section contracts and the first piezoelectric section contracts when the second piezoelectric section expands. Since the microactuator has to only overcome the inertial mass of the slider and a portion of its own inertial mass, very precise control at high frequency is possible.

14 Claims, 10 Drawing Sheets

PIEZOELECTRIC MICROACTUATOR FOR IMPROVED TRACKING CONTROL OF DISK DRIVE READ/WRITE HEADS

The present invention relates to magnetic disc drive actuation systems, and in particular magnetic disc drive actuation systems that utilize a microactuator.

BACKGROUND OF THE INVENTION

Figure 1A:
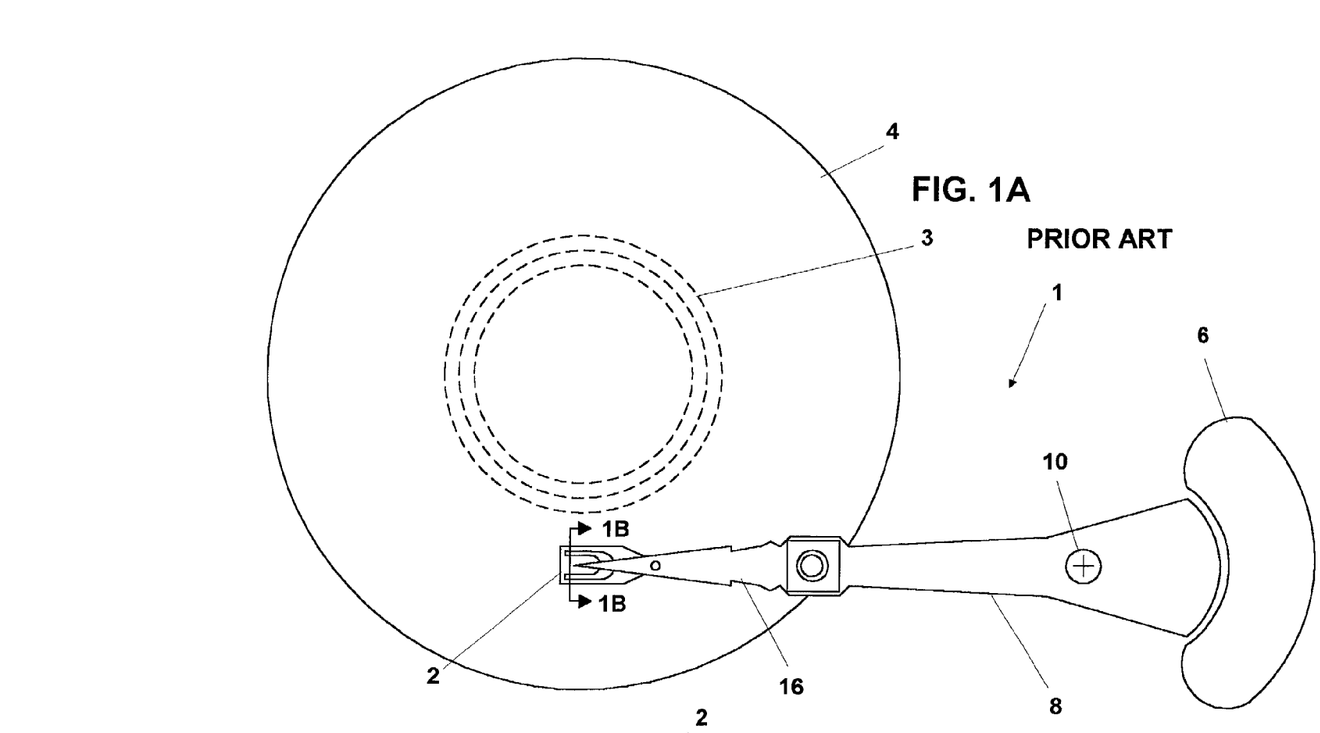
FIGS. 1A and 1B show a prior art disc drive actuation system.
Figure 1B:
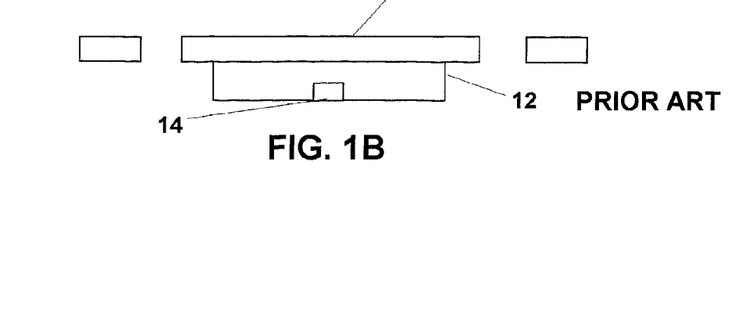

As technology has progressed, a major challenge to computer manufacturers has been to increase the amount of information that can be stored in a computer magnetic disc drive. Because data recorded in tracks of a magnetic disc drive must be followed with extreme precision, a disc drive actuation system must be very accurate. FIG. 1A shows a top view of prior art disc drive actuation system 1. Information is stored on concentric tracks 3 of magnetic recording disc 4. Voice coil motor 6 is arranged to rotate actuation arm 8 about pivot axis 10 so as to place read/write head 14 (FIG. 1B) over a track 3. Flexure 2 is suspended from suspended load beam 16. Read/write head 14 is embedded in slider 12 and rides above the surface of disc 4 on an air cushion and is pressed towards disc 4 by suspended load beam 16. Slider 12 possesses aerodynamic features to stabilize its motion on the air cushion.

Increasing track density and decreased access times have increased the demands on voice coil motor 6 to accurately position read/write head 14 over track 3. In addition, the need for faster access times makes it necessary to operate the actuation system at frequencies approaching resonance in the actuation arm. Increased track density, vibrations in the actuation arm, and vibrations in the suspension of the rotating magnetic disc can cause unacceptable tracking errors. Voice coil actuation is near the limit of the technology.

A read/write head is tracking accurately when it is positioned above the center of a track. Methods have been devised to improve tracking accuracy by inserting a piezoelectric actuator to act in conjunction with the voice coil motor to position the read/write head above the track. U.S. Pat. No. 6,052,251 (Mohajerany), U.S. Pat. No. 6,046,888 (Krinke) and U.S. Pat. No. 6,025,975 (Fard) disclose piezoelectric actuators at various positions along the actuation arm and suspended load beam, but back from the read/write head. Each of these techniques may result in improved tracking accuracy. However, because the piezoelectric actuators are located at some distance away from the read/write head, vibrations in the actuator arm are added to the piezoelectric actuator output causing read/write head motion that cannot be adequately controlled. Additionally, high frequency corrections that may be necessary to eliminate the tracking errors cause by bearing vibrations of the rotating disc are not effective when these frequencies approach the resonant frequency of the arm.

Boutaghou, U.S. Pat. No. 5,898,541, discloses a piezoelectric actuator that is positioned near the read/write head. By reference to FIG. 2 of U.S. Pat. No. 5,898,541, the piezoelectric microactuator is placed between the slider and flexure tab surface. By placing the microactuator closer to the read/write head, many of the vibration and tracking problems associated with the devices disclosed in the Mohajerany, Krinke and Fard devices are greatly reduced. However, in the Boutaghou device, there is undesirable friction between the load beam and the slider that impedes the movement of the slider relative to the load beam when the microactuator moves the slider relative to the load beam. If Boutaghou's optional compliant shear layer is utilized it will also impede the smooth motion of the slider by applying a torque to the slider as the slider rotates about the yaw axis.

Kimura, U.S. Pat. No. 4,583,135, issued in 1986 describes a tracking device in which a magnetic head is controlled with oppositely expanding and contracting piezoelectric elements sandwiched between the magnetic head and two legs of a rigid frame driven by a step motor.

What is needed is a better actuation system for improved tracking control of a magnetic disc drive read/write head.

SUMMARY OF THE INVENTION

The present invention provides a disc drive actuation system for precisely positioning a read/write head over a selected track of a rotatable disc. The actuation system comprises a flexure, a slider, and a read/write head firmly attached to the slider. A first drive unit is used to pivot the flexure to position the read/write head approximately over a selected track. A microactuator is mounted to the flexure and the slider is mounted to the microactuator. The microactuator comprises an inner inactive region, a first outer inactive region, a second outer inactive region, a first piezoelectric section mounted between the first outer inactive region and the inner inactive region, and a second piezoelectric section mounted between the second outer inactive region and the inner inactive region. The inner inactive region is firmly attached to either the flexure or the slider and both of the outer inactive regions are firmly attached to the other of the flexure or the slider. Also, there is an electrical circuit for energizing the first and the second piezoelectric sections to cause them to expand and contract in order to precisely position the read/write head over the selected track. The circuit and the piezoelectric sections are configured such that the first piezoelectric section expands when the second piezoelectric section contracts and the first piezoelectric section contracts when the second piezoelectric section expands. Since the microactuator has to only overcome the inertial mass of the slider and a portion of its own inertial mass, very precise control at high frequency is possible.

DETAILED DESCRIPTION OF THE PREFERRED EMBODIMENTS

Preferred embodiments of the present invention can be seen by reference to FIGS. 2–17.

Overview of the Operation of a Preferred Embodiment

Figure 12:
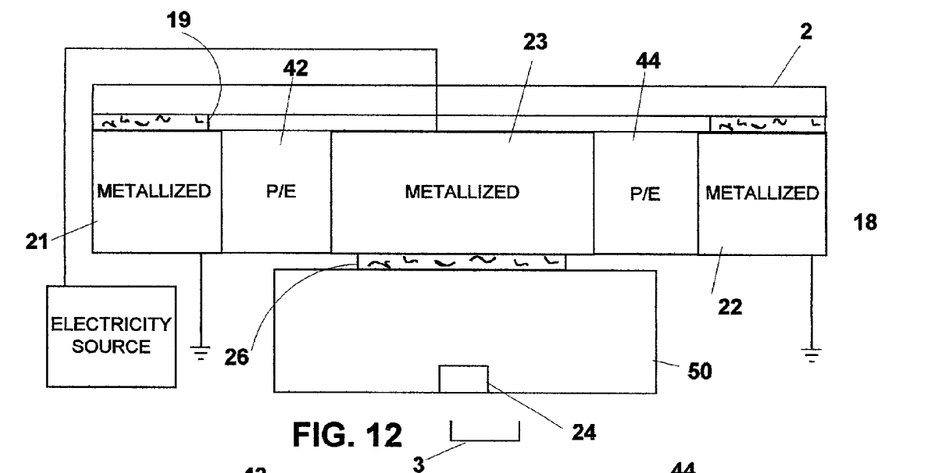
FIGS. 12–13 illustrate the operation of a preferred embodiment of the present invention.

The present invention provides a microactuator positioned near the read/write head of a magnetic disc drive for improved tracking. As shown in FIG. 12, metallized end sections 21 and 22 of microactuator 18 are mounted to the bottom of flexure 2 via adhesive bonds 19. Piezoelectric section 42 is sandwiched between metallized end section 21 and middle section 23 and piezoelectric section 44 is sandwiched between metallized middle section 23 and metallized end section 22. Metallized middle section 23 is connected to an electric source and metallized end sections 21 and 22 are connected to ground. Slider 50 with embedded read/write head 24 is mounted to the bottom of metallized middle section 23 via adhesive bond 26. The reader should note that there is no direct connection between middle section 23 and flexure 2.

Figure 13:
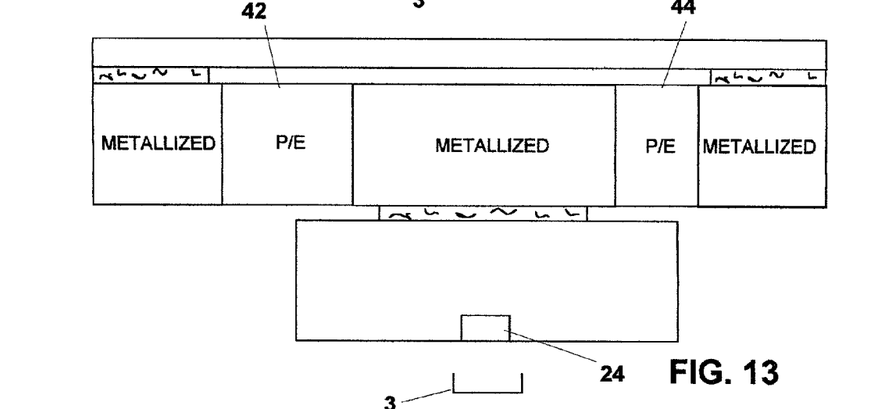

In FIG. 12, the voice coil motor has positioned read/write head 24 so that it is not correctly centered over track 3. Read/write head 24 at the trailing edge of slider 50 detects a digital signal representing the data stored on the nearest track. The amplitude of this signal will increase as read/write head 24 is moved laterally closer to the center of track 3 and decrease as it moves away. Hence, in FIG. 12, the magnitude of the digital signal is at a relatively low level since read/write head 24 is off center. In response to the decreased signal, an electric drive signal is sent from electric source 80 to metallized middle section 23. Piezoelectric sections 42 and 44 are active in that they will either expand or contract after an electric drive signal has been applied. Metallized end sections 21 and 22 and metallized middle section 23 are inactive in that they do not expand or contract after an electric drive signal has been applied. Piezoelectric sections 42 and 44 are poled out of phase with each other such that an electrical drive signal applied to both sections simultaneously will cause one section to expand laterally while the other contracts on the same axis. Therefore, as shown in FIG. 13, after the electric drive signal has been applied, piezoelectric section 42 has expanded and piezoelectric section 44 has contracted causing read/write head 24 to be centered over magnetic disc drive track 3. Note that in contrast to Boutaghou's device, there is no friction or impediment of motion between read/write head 24 and flexure 2. Since microactuator 18 only has to overcome a portion of its own intertial mass and the inertial mass of slider 50, very precise control at high frequency is possible.

Construction of a Preferred Embodiment

Figure 2:
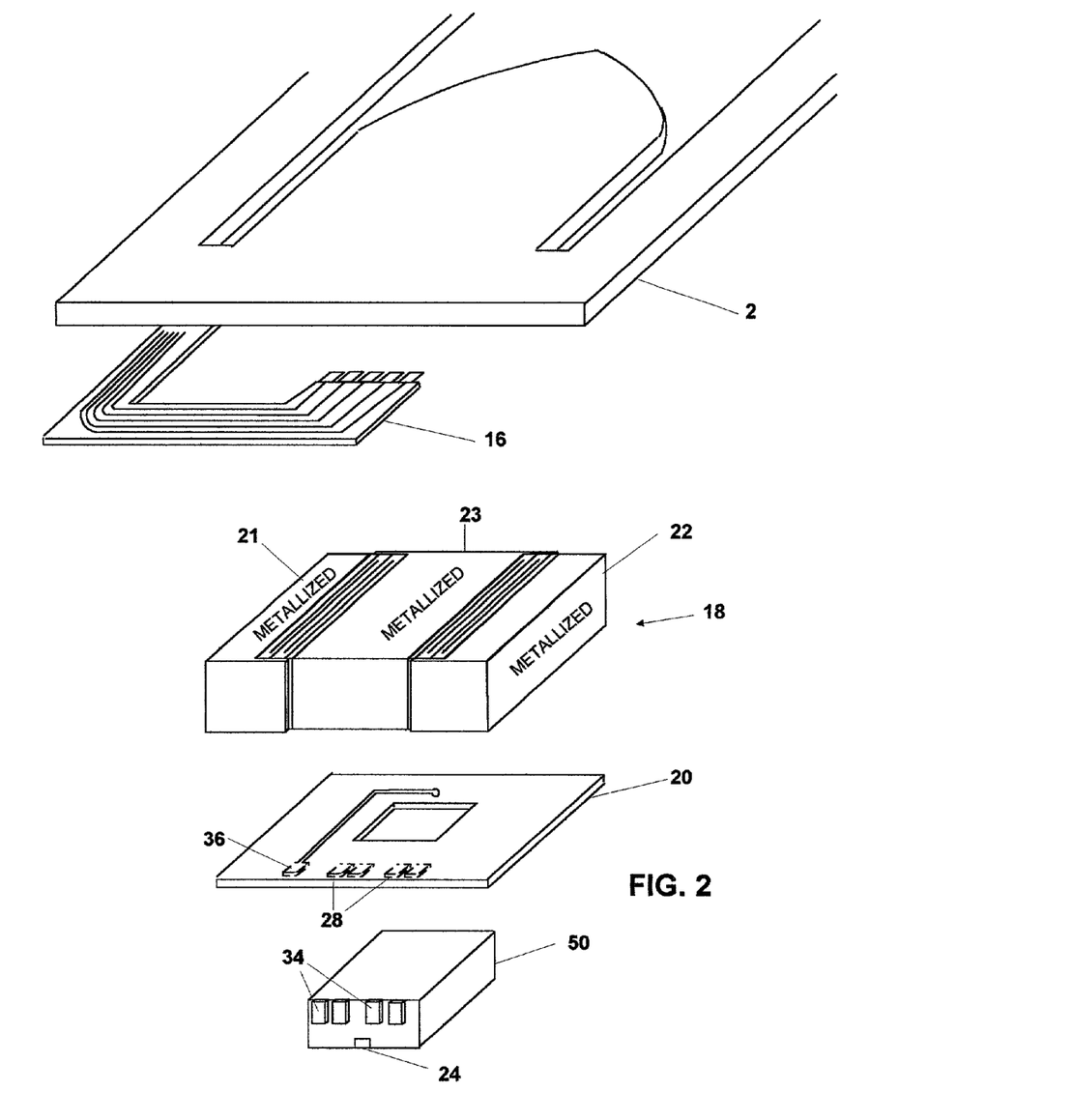
FIG. 2 shows an exploded perspective view of a preferred embodiment of the present invention.
Figure 3:
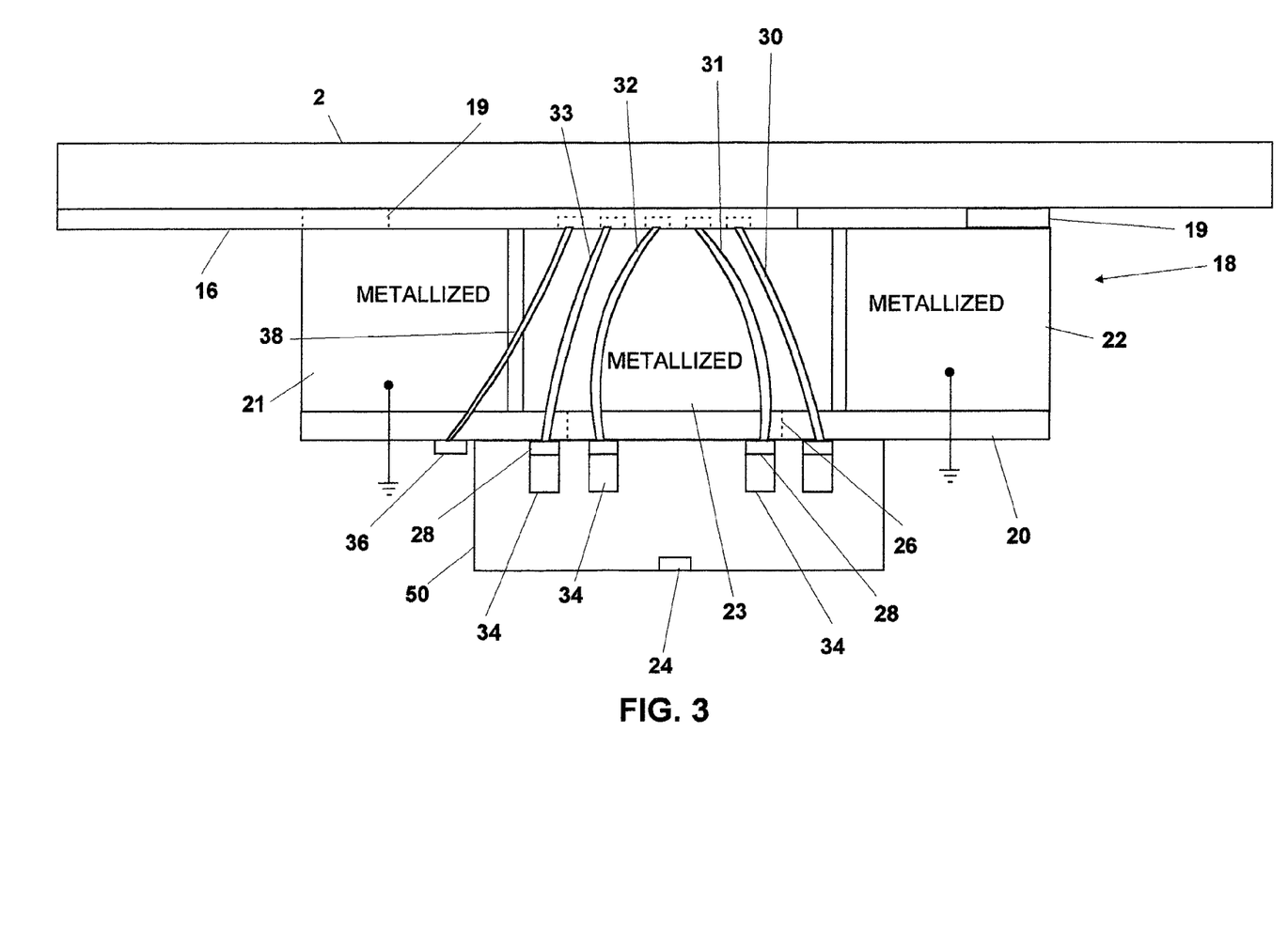
FIG. 3 shows a side view of a preferred embodiment of the present invention.
Figure 4:
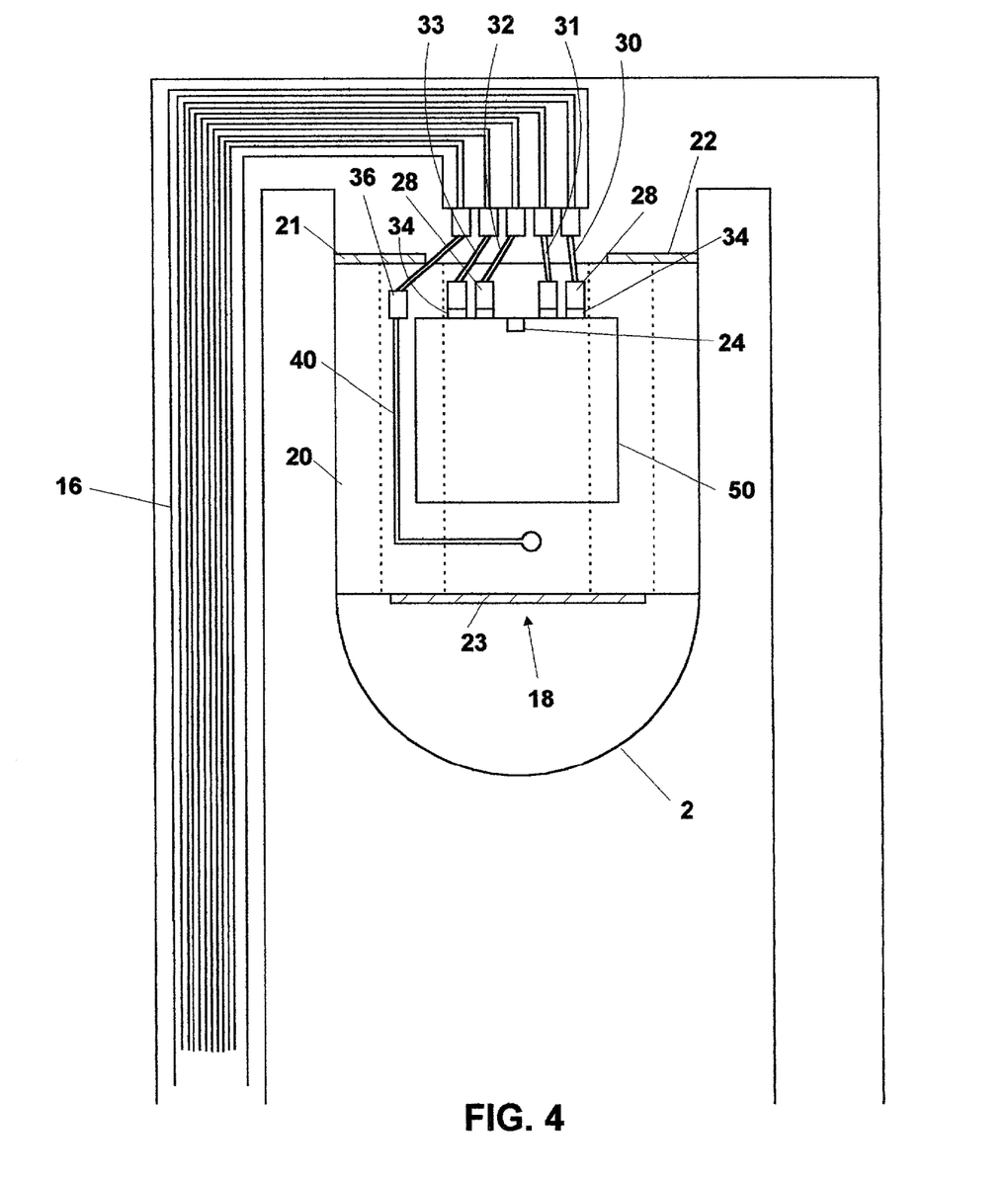
FIG. 4 shows a bottom view of a preferred embodiment of the present invention.

FIG. 2 shows an exploded perspective view, FIG. 3 shows a side view, and FIG. 4 shows a bottom view of a preferred embodiment of the present invention. Flex circuit 16 is bonded to the bottom side of flexure 2. Microactuator 18 is bonded to flexure 2 via adhesive bonds 19 at metallized end sections 21 and 22 (FIG. 3). Microactuator flex circuit 20 is bonded to the bottom side of microactuator 18. Slider 50 with embedded read/write head 24 is bonded to metallized middle section 23 of microactuator 18 via adhesive bond 26.

Electrical Connections

One feature of the present invention is a technique for facilitating the electrical connections from flex circuit 16 to slider 50. As stated above, microactuator flex circuit 20 covers the bottom side of microactuator 18 (FIG. 4). Microactuator flex circuit 20 has four miniature bonding pads 28 attached to one side. Slider 50 has four read/write connection pads 34 mounted to its side. In a preferred embodiment, after slider 50 is mounted to metallized middle section 23, read/write connection pads 34 attach easily to miniature bonding pads 28 utilizing standard reflow soldering techniques. Miniature bonding pads 28 are connected to flex circuit 16 via connection wires 30–33. In a preferred embodiment, electrical signals can travel between flex circuit 16 and slider 50 via connection wires 30–33, miniature bonding pads 28 and connection pads 34. A fifth miniature bonding pad 36 provides for an electrical connection from flex circuit 16 to metallized middle section 23 of microactuator 18. An electrical microactuator drive signal travels from flex circuit 16 via wire 38 to miniature bonding pad 36, then through microactuator drive wire 40 embedded in microactuator flex circuit 20 (as shown in FIG. 4) to metallized middle section 23.

Microactuator Construction

Figure 5A:
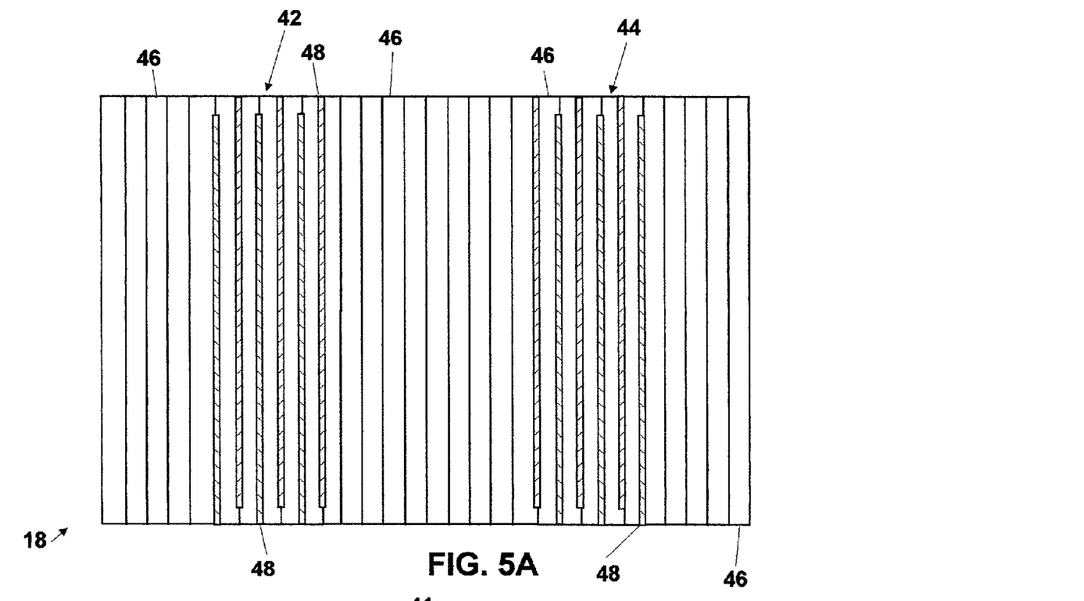
FIGS. 5A–5C show a preferred microactuator.

As shown in FIG. 5A, piezoelectric layers 46 are situated adjacent to each other. At piezoelectric section 42 and 44, metallization layers 48 are placed between adjacent piezoelectric layers 46 so that each metallization layer 48 alternately extends to either the top or bottom of microactuator 18. Then, in the preferred embodiment, microactuator 18 is heated to approximately 1100 degrees centigrade in order to firmly bond the different layers of microactuator 18 together.

Figure 5B:
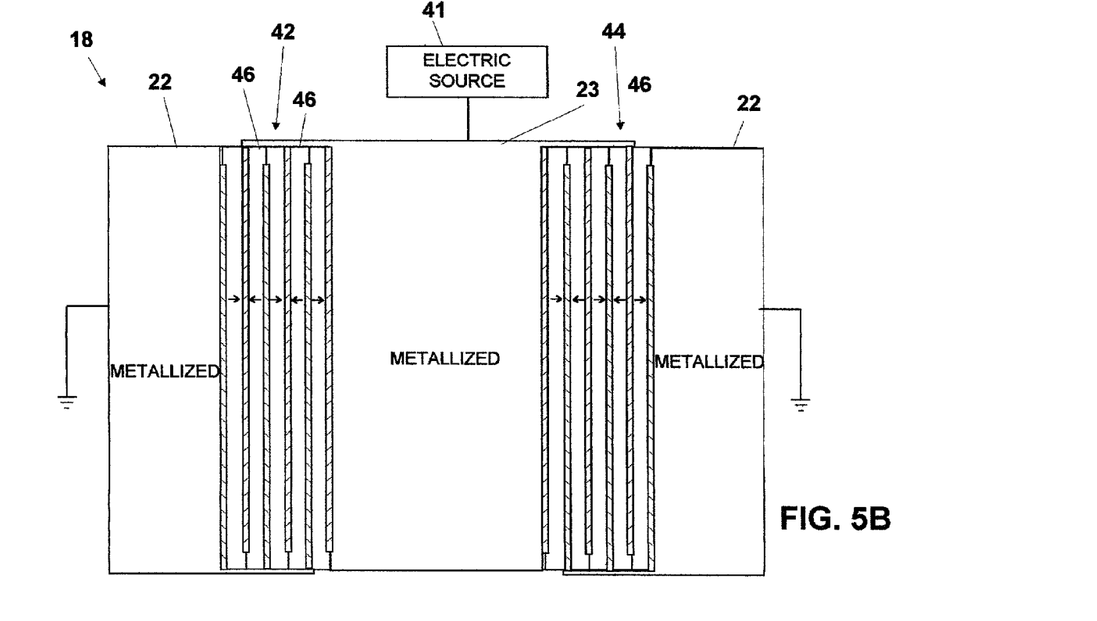

A metallization coating is then applied as shown in FIG. 5B to form metallized end sections 21 and 22 and metallized middle section 23. Note that metallization layers 48 extend alternately to the ends of microactuator 18 so that they contact either of metallized end sections 21, 22 or metallized middle section 23, but only one of the sections.

Then, electric source 41 is connected to metallized middle section 23 and metallized end sections 21 and 22 are connected to ground. Piezoelectric sections 42 and 44 are polarized by applying a large electric voltage to metallized section 23. After being polarized, the piezoelectric layers 46 in piezoelectric sections 42 and 44 will respond mechanically in a selected direction for an applied voltage across each layer. In the alternative, piezoelectric layers 46 may be poled in full sheet form before application to microactuator 18. The arrows shown in FIG. 5B indicate the preferred poling direction of piezoelectric layers 46 in piezoelectric sections 42 and 44.

Microactuator Operation

Figure 5C:
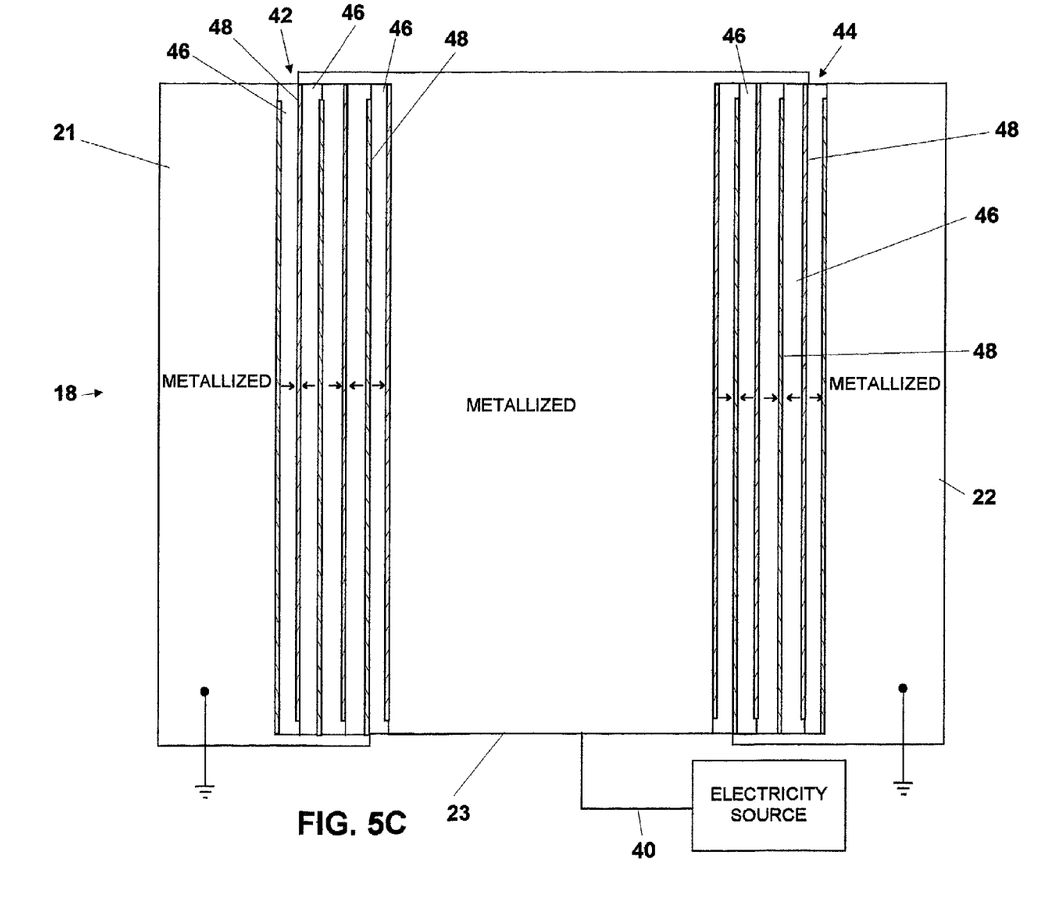

As shown in FIG. 5C, piezoelectric layers 46 are mechanically arranged in series and electrically in parallel so that the electric field required is minimized and the mechanical displacement is maximized. Metallization layers 48 connect alternately to metallized end section 21 and metallized middle section 23 in piezoelectric section 42 and metallization layers 48 connect alternately to metallized end section 22 and metallized middle section 23 in piezoelectric section 44. In the preferred embodiment shown in FIG. 5C, piezoelectric layers 46 are arranged to utilize the $d_{33}$ piezoelectric mode ($d_{33}$ describes the strain parallel to the polarization vector of the ceramics (thickness)). Poling of piezoelectric layers 46 is arranged so that piezoelectric sections 42 and 44 have opposite polarity. Piezoelectric section 44 is poled so that metallized end section 22 forms the positive electrode and metallized middle section 23 forms the negative electrode. Piezoelectric section 42 is poled so that metallized middle section 23 forms the positive electrode and metallized end section 21 is the negative electrode. In a preferred embodiment, microactuator drive wire 40 is connected to metallized middle section 23 and metallized end sections 21 and 22 are connected to ground. When a positive voltage is applied to metallized middle section 23, piezoelectric section 44 will experience a negative strain (contract) and conversely piezoelectric section 42 will experience a positive strain (expand).

Figure 6:
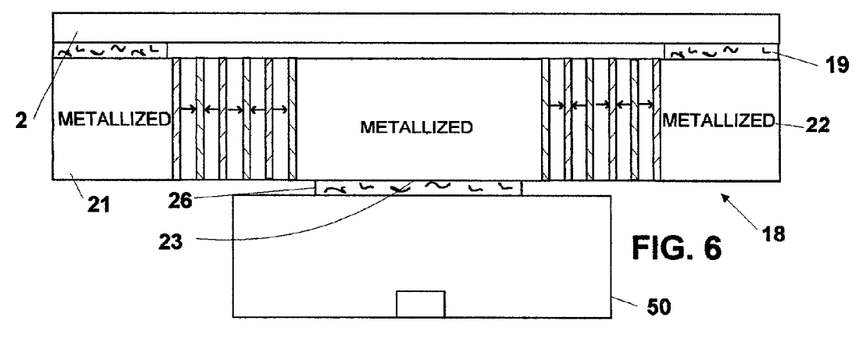
FIGS. 6–8 illustrate the operation of a preferred embodiment of the present invention.
Figure 7:
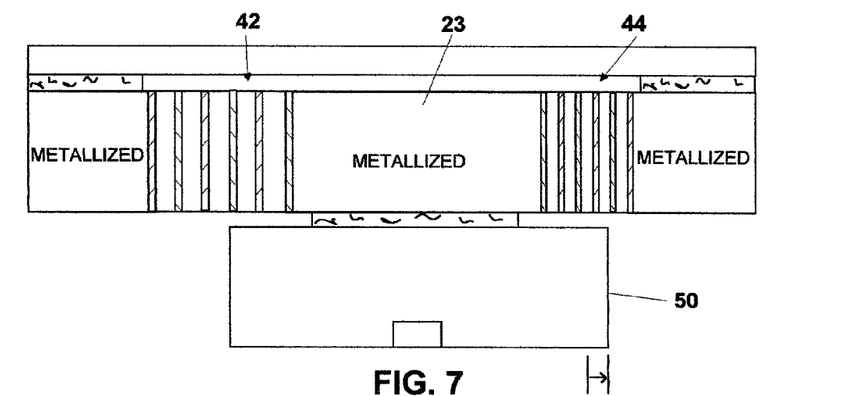
Figure 8:
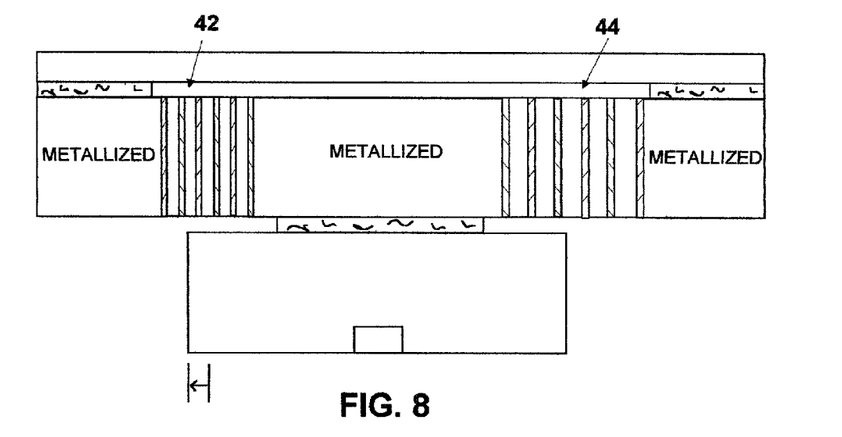

FIGS. 6–7 show a cross section view of microactuator 18 bonded to flexure 2 via adhesive bonds 19 and show slider 50 bonded to metallized middle section 23 via adhesive bond 26. FIG. 6 shows a relaxed state of microactuator 18 in which no electric potential has been applied to metallized middle section 23. In FIG. 7, a positive voltage has been applied to metallized middle section 23. Consequently, piezoelectric section 42 has expanded and piezoelectric section 44 has contracted. As a result, slider 50 has moved to the right, as indicated by the arrow. In FIG. 8, a negative voltage has been applied to metallized middle section 23. Consequently, piezoelectric section 42 has contracted and piezoelectric section 44 has expanded. As a result, slider 50 has moved to the left, as indicated by the arrow. Piezoelectric sections 42 and 44 are thus driven out of phase with one another so that when one is expanding the other is contracting. In this way, microactuator 18 does not change its width dimension, rather metallized middle section 23 moves laterally from one side to the other in response to control voltages.

Second Preferred Embodiment

A second preferred embodiment is shown in FIGS. 15–17 and FIGS. 9–11.

Figure 15:
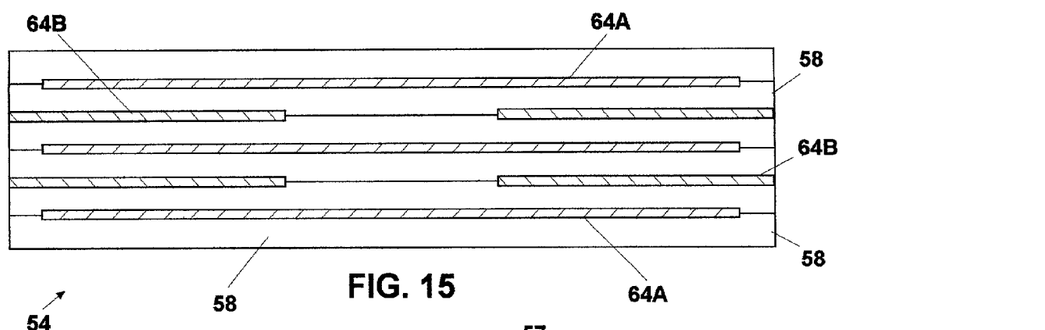
FIGS. 15–17 show another preferred embodiment of the present invention.

Microactuator 54 is constructed by first placing piezoelectric layers 58 adjacent to each other as shown in FIG. 15. Metallization layers 64A and 64B are placed between piezoelectric layers 58, as shown. Metallization layers 64A extend cross through the middle of microactuator 54, but do not extend to the end of microactuator 54. In contrast, metallization layers 64B extend to the ends of microactuator 54 but do not cross through its middle. Then, in the preferred embodiment, microactuator 54 is heated to approximately 1100 degrees centigrade in order to firmly bond the different layers of microactuator 18 together.

Figure 16:
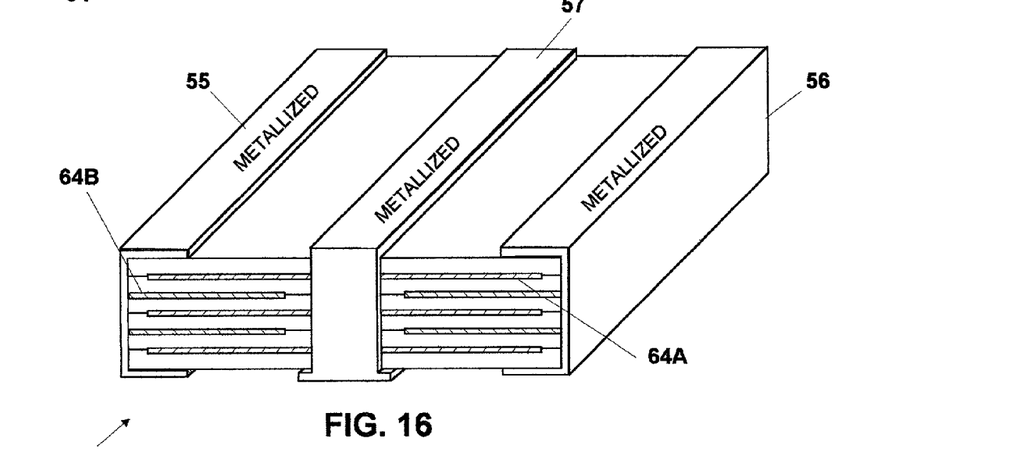

As shown in FIG. 16, a metallization coating is then applied to form metallized end sections 55 and 56 and metallized middle section 57. Note that metallization layers 64A contact metallized middle section 57 and metallization layers 64B contact either metallized end section 55 or metallized end section 56.

Figure 17:
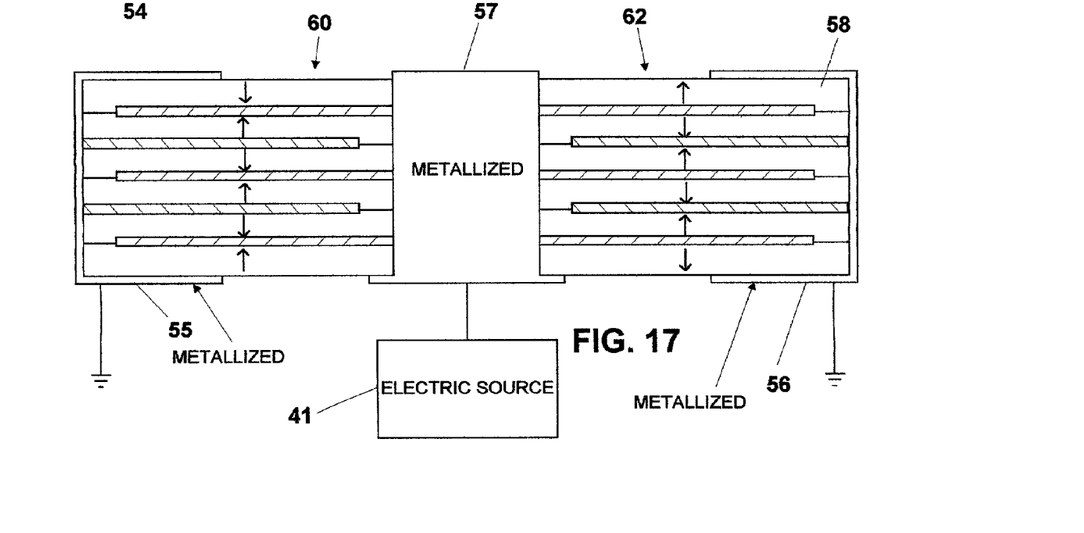

Then, as shown in FIG. 17, electric source 41 is connected to metallized middle section 57 and metallized end sections 55 and 56 are connected to ground. Piezoelectric sections 60 and 62 are polarized by applying a large electric voltage to metallized section 57. After being polarized, the piezoelectric layers 58 in piezoelectric sections 60 and 62 will respond mechanically in a selected direction for an applied voltage across each layer. The arrows shown in FIG. 17 indicate the preferred poling direction of piezoelectric layers 58 in piezoelectric sections 60 and 62.

Figure 9:
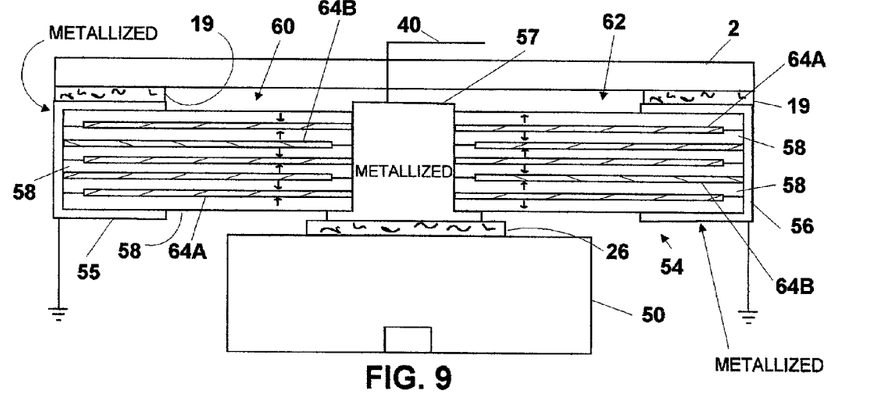
FIGS. 9–11 illustrate the operation of another preferred embodiment of the present invention.

As shown in FIG. 9, microactuator 54 is bonded to flexure 2 via adhesive bonds 19 and slider 50 is bonded to microactuator 54 via adhesive bond 26. Metallized end sections 55 and 56 are connected to ground and metallized middle section 57 is connected to a microactuator drive wire 40. In this second preferred embodiment, microactuator 54 is arranged so that piezoelectric layers 58 are arranged at 90 degrees to the orientation shown for microactuator 18 in FIGS. 6–7. Microactuator 54 utilizes the $d_{31}$ piezoelectric mode of operation ($d_{31}$ describes the strain perpendicular to the polarization vector of the ceramics (width)). Individual piezoelectric layers 58 are mechanically arranged in parallel to generate high force and structural stiffness and are electrically in parallel so that the required electric field is minimized. In piezoelectric section 60, metallization layers 64A and 64B separate each layer and are alternately connected to metallized middle section 57 and metallized end section 55, respectively. In piezoelectric section 62, metallization layers 64A and 64B separate each layer and are alternately connected to metallized middle section 57 and metallized end section 56, respectively. The arrows shown in FIG. 9 indicate the poling direction of the piezoelectric layers in piezoelectric section 62 and of the piezoelectric layers in piezoelectric section 60. The poling direction of piezoelectric section 62 is arranged such that metallized end section 56 is the positive electrode. The poling direction of piezoelectric section 60 is arranged such that metallized middle section 57 is the positive electrode.

Figure 10:
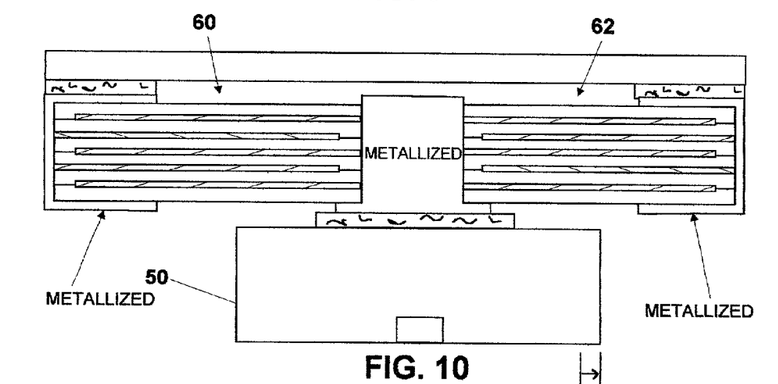
Figure 11:
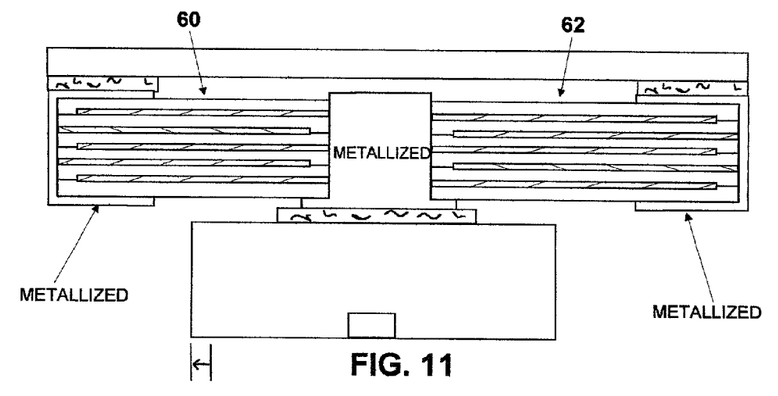

FIG. 9 shows a relaxed state of microactuator 54 in which no electrical potential has been applied to electrically conductive middle section 57. In FIG. 10, a negative voltage has been applied to metallized middle section 23. Consequently, piezoelectric section 60 has expanded and piezoelectric section 62 has contracted. As a result, slider 50 has moved to the right, as indicated by the arrow. In FIG. 1, a positive voltage has been applied to metallized middle section 23. Consequently, piezoelectric section 60 has contracted and piezoelectric section 62 has expanded. As a result, slider 50 has moved to the left, as indicated by the arrow. Piezoelectric sections 60 and 62 are thus driven out of phase with one another so that when one is expanding the other is contracting. In this way, as with the first preferred embodiment microactuator 54 does not change its width dimension, rather electrically conductive middle section 57 moves laterally from one side to the other in response to control voltages.

Third Preferred Embodiment

Figure 14:
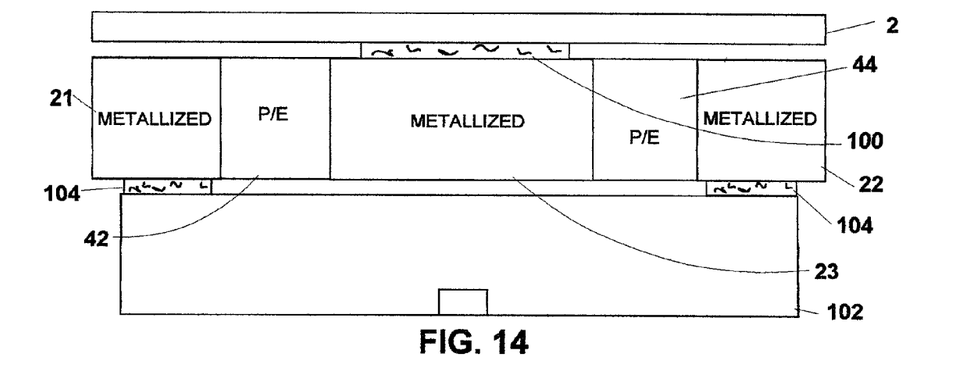
FIG. 14 shows another preferred embodiment of the present invention.

A third preferred embodiment is shown in FIG. 14. In the third preferred embodiment, metallized middle section 23 is mounted to flexure 2 via adhesive bond 100 and metallized end sections 21 and 22 are mounted to slider 102 via adhesive bonds 104. As with the other embodiments, as piezoelectric section 42 expands piezoelectric section 44 will contract allowing lateral side to side movement of slider 102 without torque or friction being applied to slider 102.

Although the above-preferred embodiments have been described with specificity, persons skilled in this art will recognize that many changes to the specific embodiments disclosed above could be made without departing from the spirit of the invention. For example, although FIG. 12 shows metallized middle section 23 connected to an electricity source and metallized end sections 21 and 22 connected to ground, one of ordinary skill in the art would recognize that metallized middle section 23 could be connected to ground and metallized end sections 21 and 22 could be connected to the electricity source. Also, although the above preferred embodiments described the present invention as being utilized to precisely position a read/write head above concentric tracks of a magnetic disc drive, one of ordinary skill in the art would recognize that it could also be used to position a read/write head above tracks of an optical disc drive, such as those of a compact disc (CD) player/recorder. Therefore, the attached claims and their legal equivalents should determine the scope of the invention.

I claim:

1. A disc drive actuation system for precisely positioning a read/write head over a selected track of a rotatable disc, said system comprising:
   A) a flexure,
   B) a slider,
   C) a read/write head firmly attached to said slider,
   D) a first drive unit for pivoting said flexure to position said read/write head approximately over the selected track,
   E) a solid microactuator not interrupted by a break or opening, said solid microactuator comprising:
      1) an inner inactive region,
      2) a first outer inactive region,
      3) a second outer inactive region,
      4) a first piezoelectric section sandwiched between said first outer inactive region and said inner inactive region,
      5) a second piezoelectric section sandwiched between said second outer inactive region and said inner inactive region,
      wherein said inner inactive region is sandwiched between said first piezoelectric section and said second piezoelectric section, wherein said inner inactive region is firmly attached to one of said flexure or said slider and both of said outer inactive regions being firmly attached to the other of said flexure or said slider,
      6) an electrical circuit for energizing said first and said second piezoelectric sections to cause them to expand and contract in order to precisely position said read/write head over said selected track, said circuit and said piezoelectric sections being configured such that said first piezoelectric section expands when said second piezoelectric section contracts and said first piezoelectric section contracts when said second piezoelectric section expands.

2. The actuation system as in claim 1, wherein said first drive unit comprises a voice coil motor.

3. The actuation system as in claim 1, wherein said first outer inactive region and said second outer inactive region are connected to said flexure and wherein said slider is connected to said inner inactive region.

4. The actuation system as in claim 1, further comprising a flex circuit for providing electrical connections to said read/write head and said microactuator.

5. The actuation system as in claim 1, wherein the disc drive actuation system is a magnetic disc drive actuation system.

6. The actuation system as in claim 1, wherein the disc drive actuation system is an optical disc drive actuation system.

7. The actuation system as in claim 1, wherein said first piezoelectric section comprises two first piezoelectric sides, wherein both of said first piezoelectric sides are opposite to each other, and wherein said second piezoelectric section comprises two second piezoelectric sides, wherein both of said second piezoelectric sides are opposite to each other, wherein one of said two first piezoelectric sides is rigidly attached to said first outer inactive region and wherein the other of said two first piezoelectric sides is rigidly attached to said inner inactive region, and wherein one of said two second piezoelectric sides is rigidly attached to said second outer inactive region and wherein the other of said two second piezoelectric sides is rigidly attached to said inner inactive region.

8. The actuation system as in claim 1, wherein said solid microactuator is a rectangular block.

9. A disc drive actuation system, comprising:
   A) a flexure,
   B) a solid microactuator not interrupted by break or opening, said solid microactuator comprising:
      1) an inner inactive region,
      2) a first outer inactive region,
      3) a second outer inactive region,
      4) a first piezoelectric section sandwiched between said first outer inactive region and said inner inactive region,
      5) a second piezoelectric section sandwiched between said second outer inactive region and said inner inactive region,
   C) a slider connected to said solid microactuator, wherein said slider is independently supported by said solid microactuator, and
   D) a read/write head connected to said slider,
   wherein said inner inactive region is sandwiched between said first piezoelectric section and said second piezoelectric section, wherein said inner inactive region is firmly attached to one of said flexure or said slider and both of said outer inactive regions being firmly attached to the other of said flexure or said slider, wherein said microactuator is configured and arranged to displace said read/write head with respect to tracks of a rotatable disc in response to control signals applied to said microactuator.

10. The actuation system as in claim 9, further comprising at least one flex circuit for providing electrical connections to said read/write head and said microactuator.

11. The actuation system as in claim 9, wherein the disc drive actuation system is a magnetic disc drive actuation system.

12. The actuation system as in claim 9, wherein the disc drive actuation system is an optical disc drive actuation system.

13. The actuation system as in claim 9, wherein said first piezoelectric section comprises two first piezoelectric sides, wherein both of said first piezoelectric sides are opposite to each other, and wherein said second piezoelectric section comprises two second piezoelectric sides, wherein both of said second piezoelectric sides are opposite to each other, wherein one of said two first piezoelectric sides is rigidly attached to said first outer inactive region and wherein the other of said two first piezoelectric sides is rigidly attached to said inner inactive region, and wherein one of said two second piezoelectric sides is rigidly attached to said second outer inactive region and wherein the other of said two second piezoelectric sides is rigidly attached to said inner inactive region.

14. A disc drive actuation system for precisely positioning a read/write head over a selected track of a rotatable disc, said system comprising:
   A) a flexure,
   B) a slider,
   C) a read/write head firmly attached to said slider, D) a first drive unit for pivoting said flexure to position said read/write head approximately over the selected track,
E) a microactuator comprising:
1) an inner inactive region,
2) a first outer inactive region,
3) a second outer inactive region,
4) a first piezoelectric section sandwiched between said first outer inactive region and said inner inactive region,
5) a second piezoelectric section sandwiched between said second outer inactive region and said inner inactive region,
wherein said inner inactive region is sandwiched between said first piezoelectric section and said second piezoelectric section, wherein said first outer inactive region and said second outer inactive region are connected to said slider and wherein said flexure is connected to said inner inactive region,
6) an electrical circuit for energizing said first and said second piezoelectric sections to cause them to expand and contract in order to precisely position said read/write head over said selected track, said circuit and said piezoelectric sections being configured such that said first piezoelectric section expands when said second piezoelectric section contracts and said first piezoelectric section contracts when said second piezoelectric section expands.

* * * * *